United States Patent Office 2,698,342
Patented Dec. 28, 1954

2,698,342

ACYLATED DERIVATIVES OF AMINO-SULFONIC ACIDS AND METHOD FOR THEIR PREPARATION

Bela Gaspar, Beverly Hills, and Paul Daniel Dreyfuss, Van Nuys, Calif., assignors, by mesne assignments, to said Gaspar No Drawing. Application November 5, 1948, Serial No. 58,620

6 Claims. (Cl. 260—507)

The present invention relates to a new process for producing N-acylated derivatives of amino sulfonic acids, and to new acylated amino sulfonic acids which are suitable as dye intermediates and to photographic materials containing acylated derivatives of amino sulfonic acids and to photographic materials containing dyes produced from such intermediate acylated amino sulfonic acids.

According to the novel process of the present invention, acylated derivatives of sulfonated amines are produced by causing functional derivatives of acids to react with sulfonated amines in anhydrous solution.

It is common practice to acylate sulfonated amines in aqueous solution. The results of this procedure are satisfactory only when the functional acid derivative, such as an acid halogenide, used in the acylation is relatively stable in aqueous solution. When a less stable acid halogenide is used, the yield of acylaminosulfonic acid decreases, and it therefore becomes necessary to use an excess of acid halogenide, a part of which is lost by hydrolysis. The loss of acid halogenide by hydrolysis is particularly harmful in the acylation of two molecular equivalents of an aminosulfonic acid with the halogenide of a dibasic acid. For example, if an aqueous solution of H-acid (2 mols) is treated with adipylchloride (1 mol) in the presence of a buffering substance such as sodium acetate or carbonate, the main reaction product which can be isolated is the mono condensation product

C₁₀H₄(OH)(SO₃H)₂·NH—CO—(CH₂)₄—COOH while the symmetrical product

[C₁₀H₄(OH)(SO₃H)₂·NH—CO—(CH₂)₂—]₂ is formed only in inferior yield. The yield of symmetrical product can be increased to a certain degree by a fine adjustment of the reaction conditions such as temperature and pH, by using more aminonaphtholsulfonic acid than is theoretically required, and by the addition of the adipylchloride at a very slow rate. Even under the most favorable conditions, mixtures of the mono- and the biscondensation products are obtained, which must be separated by methods peculiar to each case.

We found that the bis products (sometimes referred to as "twin molecules" or "symmetrical products" in the following) can be obtained in good yield and in a pure state by performing the condensations in anhydrous solvents, i. e., where the acid halogenides are stable and where therefore the competing hydrolysis of the acid halogenides does not interfere with the acylation of the aminosulfonic acids. The main difficulty in developing this principle into a generally applicable method is the insufficient solubility of the sulfonic acids and their salts with inorganic bases in suitable anhydrous solvents.

It is known that the acylation of an aminosulfonic acid or of a salt thereof with an inorganic base, can be performed with a suspension in an anhydrous medium, for example, in pyridine or in dimethylformamide. However, the sulfonated amines, and particularly the aminonaphthol sulfonic acids, and their salts with inorganic bases are practically insoluble in the media heretofore used.

We found that the salts of aminosulfonic acids with strong organic bases are well soluble in organic solvents such as pyridine, dioxane, acetone or in mixtures of these solvents. Suitable organic bases are those which do not decompose the acylating agents, for example, tertiary and quaternary bases, penta-alkylguanidines and peralkylated guanidonium bases. The salts of sulfonic acids with tertiary and quaternary bases containing at least one aliphatic or hydroaromatic radical containing more than five carbon atoms are particularly soluble in organic solvents. After the acylation is completed, the organic base is recovered and the acylaminonaphthol sulfonic acid is isolated in the form of its salt with an inorganic base. The following are some of the bases which may be used:

Triisohexylamine
Tricetylamine
Dimethylmyricylamine
N-cyclohexylpiperidine
N,N,N′,N′-tetramethyl-ethylenediamine
Triethylcetylammonium hydroxide
N,N′-dipropylpiperazine-monohydroxypropylate
Pentaethylguanidine
Hexaethylguanidonium hydroxide The following examples will illustrate further our invention:

*Example 1.—N,N′-adipyl-bis-(1-amino-8-hydroxy-naphthalene-3,6-disulfonic acid)*

One mol of dried 1-amino-8-hydroxynaphthalene-3,6-disulfonic acid, 1.5 liter of anhydrous pyridine and 2 mols of dodecyldimethylamine are placed in a three-neck round bottom flask fitted with stirrer, dropping funnel and condenser for downward distillation. All possible traces of water are removed by distillation of 500 ml. of the solvent which are replaced with an equal volume of anhydrous pyridine. The condenser is turned into reflux position and the homogenous solution is cooled to about 30° C. One-half mol of adipylchloride is added slowly through the dropping funnel to the well stirred solution, and the temperature is kept at 30° C. for one hour after the addition of the acid chloride. Thereupon the solution is heated to boiling, cooled to about 60° C. and a saturated alcoholic solution of 2 mols of anhydrous sodium acetate is added. The sodium salt of the adipyl-bis-H-acid precipitates. It is filtered off and for most purposes sufficiently pure after being washed with alcohol. No adipyl-mono-H-acid and no ester can be detected in the raw product. If a still purer material is required, it can be recrystallized from water.

The 1-amino-8-hydroxynaphthalene-3,6-disulfonic acid used in the above example is obtained in the following way: Commercial H-acid (acid sodium salt of 1-amino-8-hydroxy-naphthalene-3,6-disulfonic acid) is dissolved in hot water. By addition of BaCl₂ the more difficultly soluble acid barium salt crystallizes, which is filtered off and washed with distilled water. The barium salt is suspended in water, and an equivalent quantity of sulfuric acid is added. Barium sulfate is removed by filtration; the filtrate is concentrated by evaporation, and the aminonaphtholdisulfonic acid is precipitated with concentrated hydrochloric acid. It is filtered, slurried in acetone, filtered again and dried to form a silky white mass.

The dodecyldimethylamine salt of 1-amino-8-hydroxy-naphthalene-3,6-disulfonic acid, prepared from the free acid in the above illustration can also be obtained from the amine and commercial H-acid in aqueous solution. However, the salt thus prepared retains water and other impurities. The presence of inorganic cations is harmful as they tend to decrease the solubility of the product in organic solvents. The product, therefore, must be freed from inorganic salts and is best dried by azeotropic distillation.

In all those instances where the free organic base to be used in the salt formation is unstable (as is the case with many quaternary bases), or where these bases are easily available only in aqueous solutions, it is advantageous to prepare the salts of these bases with the aminosulfonic acids in aqueous solutions. If a solution of a quaternary salt containing an inorganic anion is added to a solution of a salt of an aminosulfonic acid with inorganic cation, the quaternary salt of the aminosulfonic acid precipitates. In other cases it is more convenient to combine the sulfate of the quaternary amine with the barium salt of the aminosulfonic acid, to leach the precipitate with alcohol and to evaporate the filtrate.

If in the foregoing example the H-acid is replaced with other aminonaphtholsulfonic acids such as J, gamma, M, S, B, K, RR, sulfo-J and their N-alkyl and N-aryl derivatives such as the N-ethyl and N-phenyl derivatives, and if the adipylchloride is replaced with other acid dihalogenides, analogous symmetrical condensation products are obtained. Suitable acid dihalogenides are, for example, oxalylchloride, malonylchloride and its alkyl substituted derivatives, sebacyl chloride, azelayl chloride, diglycolic acid dichloride, ethylene-bisglycolic acid chloride, terephthaloylchloride, phenylene-1, 3-diacetylchloride, hydroquinone-O-O-diacetylchloride, the dichloride of N,N'-bis-(m-carboxybenzenesulfo) - p-phenylenediamine, naphthalene-1, 5-disulfochloride, diacetyl benzidinesulfonedisulfochloride.

Phosgene and thiophosgene produce ureas and thioureas (from which the corresponding guanidines may be obtained), identical with those previously obtained by synthesis in aqueous solution.

If the compounds of this invention are called "symmetrical" or "twin-molecules," these terms shall be understood to comprise compounds, obtained from asymmetrical dibasic acid chlorides such as the dichlorides of d,1-pyrotartaric acid, or of 2-furoic acid-5-sulfonic acid, as well as those compounds obtained by acylating mixtures of aminonaphtholsulfonic acids such as an equimolecular mixture of H-acid and K-acid.

It is furthermore understood that this invention comprises the preparation of products containing substituents in the acyl radical such as nitroterephthaloyl-bis-K-acid its reduction product aminoterephthaloyl-bis-K-acid and acyl derivatives thereof, as, for example, (2-phthalimido-ethanesulfamido)-terephthaloyl-bis-K-acid and adipyl-bis-(aminoterephthaloyl-bis-K-acid).

Heretofore known compounds such as the symmetrical carbonyl compounds of German Patent 278,122 can be successfully prepared from diarylurea diacidhalogenides according to the present invention.

The process in accordance with the invention is suitable for the preparation of N-acyl derivatives of aminosulfonic acids in general, and is especially adapted for the production of compounds of the general formula

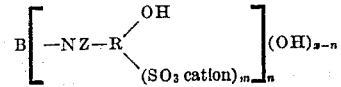

wherein R stands for a naphthalene residue, $m$ stands for one or two, Z stands for hydrogen, alkyl or aryl, $B(OH)_{x-n}$ is an $n$ valent acyl radical derived from a polybasic acid $B(OH)_x$ wherein $x$ is an integer at least as great as $n$, and particularly wherein B is a divalent acyl radical derived from a dibasic acid $B(OH)_2$.

It is well known that the aminonaphtholsulfonic acids, having the amino and hydroxy groups in the 1,8-position, are not capable of forming symmetrical ureas with phosgene or thiophosgene. We found that the reaction with bifunctional acid halogenides according to our new methods allows the preparation of simple symmetrical compounds which may be used as substitutes for the non-existing simple ureas; for example, in the manufacture of dyes. Particularly the twin molecules, obtained from 1,8-aminonaphtholsulfonic and disulfonic acids with the dicarboxylic acid chlorides $R(COCl)_2$ where R is a hydrocarbon or oxahydrocarbon radical, are valuable components from which dyes derive which are very fast to light and are particularly useful for photographic purposes.

If cyanuric chloride, cyanuric tircarboxylic acid chloride, tricarballylic acid chloride or any other functional derivative of a tri- or polybasic acid is caused to react with an aminonaphtholsulfonic acid in aqueous solution, condensation products 1:1 are easily obtained, condensation products 1:2 are more difficulty prepared, and condensation products 1:3 (or, in the case of the acylation with derivatives of n-basic acids, condensation products 1:n) are in many cases unobtainable. According to our invention, the condensation products 1:3 (or generally, 1:n) are easily obtained from said acylating agents and aminonaphtholsulfonic acids under anhydrous conditions.

The acylation under anhydrous conditions, as exemplified above, is equally suitable for the preparation of simple acylaminonaphtholsulfonic acids and is preferred whenever the acid halogenide used in the reaction is valuable and/or unstable. As a general rule, the anhydrous acylation as compared with the acylation in aqueous medium gives better yields in acylaminosulfonic acids, relative to the quantity of acid halogenide used in the reaction.

In many cases it is advantageous to replace the acid halogenide with other acylating agents such as esters, anhydrides or ketenes. For example, salicyloyl-J-acid may be prepared according to the procedure given in the above example or by heating the cetyldimethylamine salt of J-acid, dissolved in quinoline, with salol.

By heating the dodecyldimethylamine salt of H-acid, dissolved in anhydrous pyridine, with an ethylenemaleic anhydride interpolymer, an amorphous acid is obtained which is supposed to have the formula

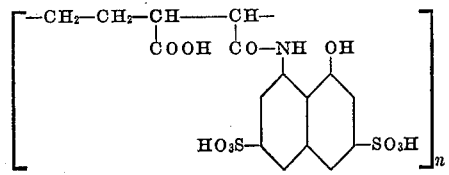

Many other applications of this invention are possible: The "twin molecules" of German Patent 288,273, where the aminonaphtholsulfonic acid residues are replaced with naphthylaminesulfonic acid residues can be obtained by our method in good yield. N,N'-oxalyldisulfanilic acid, prepared heretofore by sulfonation of oxanilide, is obtained in one operation from the cetyldimethyl-benzylammonium salt of sulfanilic acid, dissolved in a dioxane-pyridine mixture, and oxalylchloride. Sulfonated arylamides of ketoacids such as N,N'-di-(acetoacetyl)-benzidine-2,2'-disulfonic acid and similar compounds which could not be obtained according to known general procedures, are obtainable according to our method by causing ketoesters to react with soluble salts of aminoaryl acids in organic solvents.

After the cymmetrical acyl-bis-aminonaphtholsulfonic acids were obtained in an unequivocal way by our new method and after their properties were investigated, we found that, in some cases, it is possible to isolate the same products from the reaction mixtures which are obtained if the acylations are carried out in aqueous media.

Example 2.—The adipyl-bis-H-acid of the foregoing Example 1 can be obtained in the following way:

One mol of commercial H-acid (acid sodium salt), one mol of sodium hydroxide and two mols of sodium acetate are dissolved in 2 ltr. of water. 200 ml. of acetone are added, and the solution is cooled to 0° C. Adipylchloride (0.3 mol) is added dropwise and the solution is stirred vigorously with a very efficient stirrer. The solution begins to thicken into a paste. After two hours the paste is warmed up, rendered alkaline by addition of sodium carbonate and kept at 70° C. for thirty minutes to saponify the O-acyl compounds formed as by-products. Thereupon the solution is made weakly acidic (litmus) with acetic acid, the products salted out with calcium chloride and filtered. H-acid can be recovered from the filtrate while the precipitate is essentially a mixture of the calcium salts of adipyl-mono and bis-H-acid. The calcium salt of the adipyl-bis-H-acid is much less soluble than the calcium salt of the adipyl-mono-H-acid, and the products can therefore be separated by fractionation in water. The calcium salt of the adipyl-bis-H-acid sometimes precipitates as a voluminous mass which is difficultly filterable. It can be dissolved by addition of ammonia and precipitated in crystalline form by slow addition of acetic acid to the warm solution.

If more adipylchloride than indicated is used, the yield of adipyl-H-acids is increased. But the yield of adipyl-mono-H-acid is increased more than that of the bis-product, and the isolation of pure bis-product becomes difficult. The practically available yield of bis-product therefore is not increased, if more than 0.3 mol of adipyl-chloride are used.

If, in the foregoing Example 2, sebacylchloride is used instead of the adipylchloride, a mixture of sebacyl-mono and bis-H-acids is obtained. Pure sebacyl-bis-H-acid is obtained by fractionating the sodium salts of this mixture.

If a more stable acid halogenide such as naphthalene-1,5-disulfochloride is used and the reaction run at higher temperature, the symmetrical condensation product can be obtained in better yield than with a less stable acid halogenide, even in aqueous solution. The naphthalene-1,5-disulfo-H-acid is salted out from the reaction mixture with potassium carbonate, dissolved in water, and reprecipitated with potassium carbonate. The precipitate is freed from adherent potassium carbonate by being slurried in alcohol containing a sufficient quantity of glacial acetic acid to neutralize the potassium carbonate.

The condensation products of polybasic acids with aminonaphtholsulfonic acids are valuable dye intermediates. Whereas these bis-products form dyes of practically the same shade as do the mono-products, other qualities of the bis-products and of the dyes prepared thereof differ from those of the corresponding mono-products.

If used as coupling components in layers of photographic multilayer materials, such as described in United States Patent 2,071,688 and subsequent patents, the condensation products of polybasic acids with aminonaphtholsulfonic acids diffuse little or not at all from one colloid layer into an adjacent layer. The corresponding simple coupling components, if incorporated into a photographic colloid, show a high degree of diffusion. For example, the simple acylamino-naphtholsulfonic acids heretofore known either diffuse, or their tendency to diffuse is decreased by the introduction of substituents which diminish their solubility in aqueous media, or which increase the molecular weight to such an extent that the tinctorial strength becomes low. The "twin molecules" of this invention, however, are well soluble in water, diffuse less than do comparable "single" molecules and, upon dye formation, give dyes of high tinctorial strength. Furthermore, they have no adverse effects on the sensitivity and other photographic qualities of photographic emulsions.

As intermediates, the compounds of this invention are particularly useful in the production of polymeric dyes, obtained by coupling with tetrazo components, such as described in the co-pending patent application S. N. 537,967 filed May 29, 1944, now U. S. Patent 2,470,769 granted May 24, 1949, and reissued as Reissue 23,357 granted April 17, 1951.

Other useful dyes are formed from the acylamino-naphtholsulfonic acids of this invention when coupled with as many equivalents of a monodiazo compound as possible, whereby dyes are formed in which the number of dye units (as defined in application S. N. 537,967) is only relatively small as, for example, in the magenta dye, obtained from diazotised 4-chloro-2-aminoanisole (2 mols) and sebacyl-bis-K-acid (1 mol). A comparison of this twin dye and of its simple analogue chloranisidine→valeryl-K-acid, both incorporated in photographic gelatine layers, shows that the simple dye diffuses into an adjacent layer, whereas the twin dye under identical conditions diffuses much less. However, other properties of this twin dye, such as tinctorial strength, solubility, bleaching properties in the places where metallic silver is present, fastness to light and inertness with regard to the sensitivity of a silver halide emulsion remain unimpaired.

The compounds obtained by condensation of aminonaphtholsulfonic acids with higher dibasic acids such as azelaic or hydroquinone-O-O-dibutyric acids or with polybasic acids such as 1,3,5-triazine-2,4,6-tricarboxylic acid, are preferably used as coupling components in photographic emulsions, whereas the symmetrical compounds obtained from aminonaphtholsulfonic acids and lower dibasic acids such as succinic and adipic acids serve best as intermediates for the preparation of polymeric dyes to be incorporated in photographic emulsions.

*Example 3*

20 ml. of a 3% solution of the dye (2,5-dichlorobenzene)-(1 azo 7)-(8-amino-1-naphthol-3,6-disulfonic acid) and 16 ml. of a 3% solution of anhydrobiguanidobenzylalcohol acetate are added to 150 ml. of a silver bromide gelatin emulsion with due precaution that the precipitated dye does not separate out. The dyed emulsion is sensitized to red light and coated on a transparent cellulose acetate base. On top of this emulsion is coated a green sensitive emulsion which contains 0.7 gr. of N,N'-sebacyl-bis-H-acid, and an equal amount of calcium lactate per 150 ml. emulsion. Thereon is coated a fogged emulsion containing 0.5 gram of Paper Yellow 3G (Schultz, Farbstofftabellen, 7th ed., No. 724) and 0.6 gram of the biguanide acetate agent as above, and finally an unsensitized emulsion containing for 150 ml. emulsion 0.7 gram of 1,1' - [3,3' - disulfo - diphenylene - (4,4')] - bis-[pyrazolone-(5)-carbonic acid-(3)] and an equal amount of the above mentioned polybiguanide acetate.

*Example 4*

The photographic material of the Example 3 is exposed, developed and fixed in known manner. Thereupon the superimposed silver images are converted into silver salt images, for example, in a copper chloride bath into silver chloride images. After a thorough wash, the material is transferred into a bath containing per liter solution:

0.3 gram of 4-chloro-1-methoxybenzenediazonium beta-naphthalene-sulfonate
3.5 ml. glac. acetic acid
2.1 gr. sodium acetate (anhydrous)

After about 10 minutes the coupling of the three dyes is completed; thereupon the silver salt is redeveloped into metallic silver, and the dyes are destroyed locally, for example, according to Gaspar U. S. Patent Re. 22,308. After removing the residual silver in known manner, an image in natural colors is obtained.

The properties of the dyes, obtained from the compounds of this invention, particularly their reduced tendency to penetrate colloids, make them valuable, not only for photographic purposes but in other fields, for example, in the dyeing of textiles as well.

Since from the foregoing description of the invention it will be apparent to those skilled in the art that many variations of this invention may be made without departing from the spirit and scope thereof, it is to be understood that we do not limit ourselves to the specific examples thereof, except as defined in the appended claims.

We claim:

1. In a process for the N-acylation of an aromatic amine sulfonated in the aromatic nucleus with an organic acylating agent, the steps which comprise reacting said sulfonated aromatic amine with an at least tertiary nitrogen base which itself is not acylated by said acylating agent to form the salt of said sulfonated aromatic amine with such base, said at least tertiary nitrogen base having at least one hydrocarbon radical containing more than five carbon atoms and being selected from the group consisting of tertiary amines, quaternary ammonium bases, guanidines and guanidonium bases, said guanidines containing at least one tertiary nitrogen, and acylating said salt with a polyvalent organic acylating agent which does not form water during the reaction under essentially anhydrous conditions in a non-polar organic solvent for said salt.

2. In a process for the N-acylation of a sulfonated aminonaphthol with an organic acylating agent, the steps which comprise reacting said sulfonated aminonaphthol with a tertiary amine which itself is not acylated by said acylating agent to form the salt of said sulfonated aminonaphthol with said amine, said tertiary amine having at least one hydrocarbon radical containing more than five carbon atoms, and acylating said salt with a polyvalent organic acylating agent which does not form water during the reaction under essentially anhydrous conditions in a non-polar organic solvent for said salt.

3. In a process as defined in claim 2, wherein said hydrocarbon radical is an aliphatic radical and said polyvalent organic acylating agent is a dibasic acylating agent.

4. In a process for the N-acylation of a sulfonated aminonaphthol with an organic acylating agent, the steps which compirse reacting said sulfonated aminonaphthol with a tertiary amine which itself is not acylated by said acylating agent to form the salt of said sulfonated aminonaphthol with said amine, said tertiary amine having at least one aliphatic radical containing more than five carbon atoms, and acylating said salt with an organic acyl dihalogenide under essentially anhydrous conditions in a non-polar organic solvent for said salt.

5. A compound of the general formula

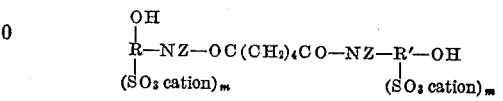

wherein R and R' are each a naphthalene nucleus, m is an integer of from 1 to 2, and Z is hydrogen.

6. A compound of the general formula
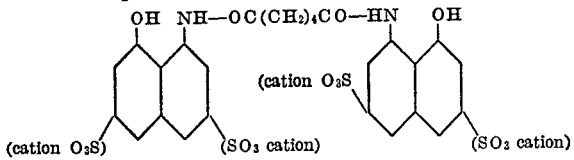
References Cited in the file of this patent
UNITED STATES PATENTS
| Number | Name | Date |
|---|---|---|
| 458,286 | Kuzel | Aug. 25, 1891 |
| 994,420 | Neilmeier | June 6, 1911 |
| 1,871,513 | Grether | Aug. 16, 1932 |
| 1,882,560 | Glietenberg et al. | Oct. 11, 1932 |
| 1,932,180 | Guenther | Oct. 24, 1933 |
| 1,998,563 | Stusser | Apr. 23, 1935 |
| 2,028,279 | Gaspar | Jan. 21, 1936 |
| 2,137,336 | Gaspar | Nov. 22, 1938 |
| 2,328,159 | Martin | Aug. 31, 1943 |
| 2,497,131 | Lubs | Feb. 14, 1950 |
FOREIGN PATENTS
| Number | Country | Date |
|---|---|---|
| 25,332 | Norway | Jan. 4, 1915 |
| 2,478 | Netherlands | Mar. 5, 1918 |